United States Patent [19]

Lloyd

[11] Patent Number: 4,494,365
[45] Date of Patent: Jan. 22, 1985

[54] MOWER CUTTING UNIT

[76] Inventor: Lawrence L. Lloyd, 1001 Olmstead Ave., Pacific Grove, Calif. 93950

[21] Appl. No.: 545,971

[22] Filed: Oct. 26, 1983

[51] Int. Cl.³ .............................................. A01D 55/18
[52] U.S. Cl. ....................................... 56/256; 56/229; 172/52
[58] Field of Search ....................... 56/229, 256; 171/5; 172/52

[56] References Cited

U.S. PATENT DOCUMENTS

| 366,879 | 7/1887 | Ristvedt | 172/151 |
|---|---|---|---|
| 1,008,708 | 11/1911 | Eidem | 172/69 |
| 1,407,962 | 2/1922 | Thomas | 58/294 |
| 1,633,802 | 6/1927 | Wright | 58/294 |
| 2,032,777 | 3/1936 | Thomas | 56/229 |
| 2,204,569 | 6/1940 | Bushong | 97/6 |
| 2,246,880 | 6/1941 | Erke et al. | 56/294 |
| 2,300,851 | 11/1942 | Wolfard | 55/21 |
| 2,526,396 | 10/1950 | Nowlin | 97/140 |
| 3,338,037 | 8/1967 | Bauer et al. | 56/24 |
| 3,452,823 | 7/1969 | Shapland, Jr. | 172/42 |
| 3,641,754 | 2/1972 | Anstee | 56/341 |
| 3,739,856 | 6/1973 | Rax | 56/256 |
| 3,783,592 | 1/1974 | Schraut | 56/13.3 |
| 3,937,285 | 2/1976 | van der Lely | 172/52 |
| 4,202,414 | 5/1980 | vom Braucke et al. | 172/42 |
| 4,402,366 | 9/1983 | Dankiel | 172/52 |

OTHER PUBLICATIONS

Toro Owner's Manual for Greensmaster Cutting Unit Model No. 04400.
Advertisement for Hahn Greens Management System, Model Tournament 1202 attachment entitled "Verti--Cut" Thatcher.
Toro Owner's Manual for Greensmaster 3, Model No. 04311-10001, pp. 1, 7 and 8.
*Golf Course Management,* Apr. 1983, p. 30, advertisement for Bunton Greensmower.
*Grounds Management,* Apr. 1983, pp. 19-20.
*Golf Business,* Mar., "Verticutting Produces Smoother, Healthier Turf" by Dr. Fred V. Grau.

*Primary Examiner*—Paul J. Hirsch
*Attorney, Agent, or Firm*—Townsend and Townsend

[57] ABSTRACT

An improved cutting unit specially suited for grooming turf includes a frame supporting a conventional horizontally mounted driven reel having a number of spirally arranged blades. The cutting unit is supported on the ground by front and rear rollers. The front roller is a slotted expunger roller having numerous annular slots along its axis. Immediately behind the expunger roller is mounted a knife roller which includes numerous vertically oriented knife blades aligned with the circular slots of the expunger roller. As the expunger roller rolls along turf, horizontally lying plant material is pulled or puckered up by the expunger roller into the circular slots. The knife roller, driven at a high rate of speed about its own axis, pulls up and slices through the pulled up plant material. The expunger roller is mounted to the frame while the knife roller is pivotally mounted to the expunger roller to allow the height of the knife roller to be varied without changing the height of cut or the distance between the knife and expunger roller axes.

23 Claims, 10 Drawing Figures

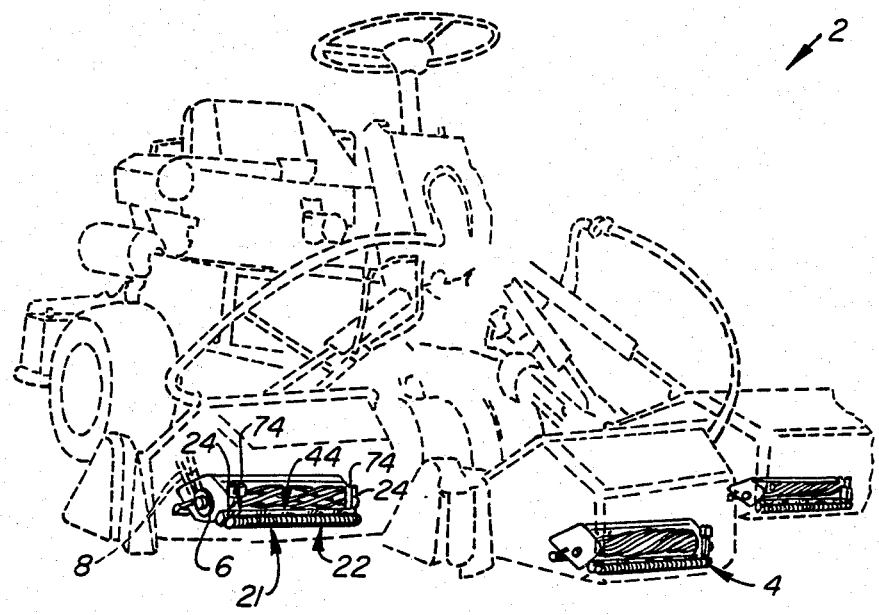
FIG._1.
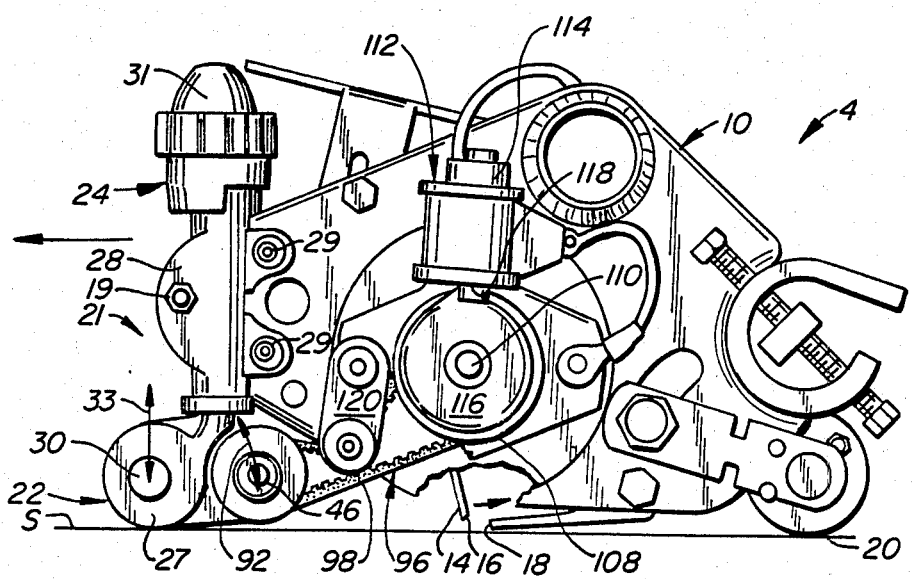
FIG._2.

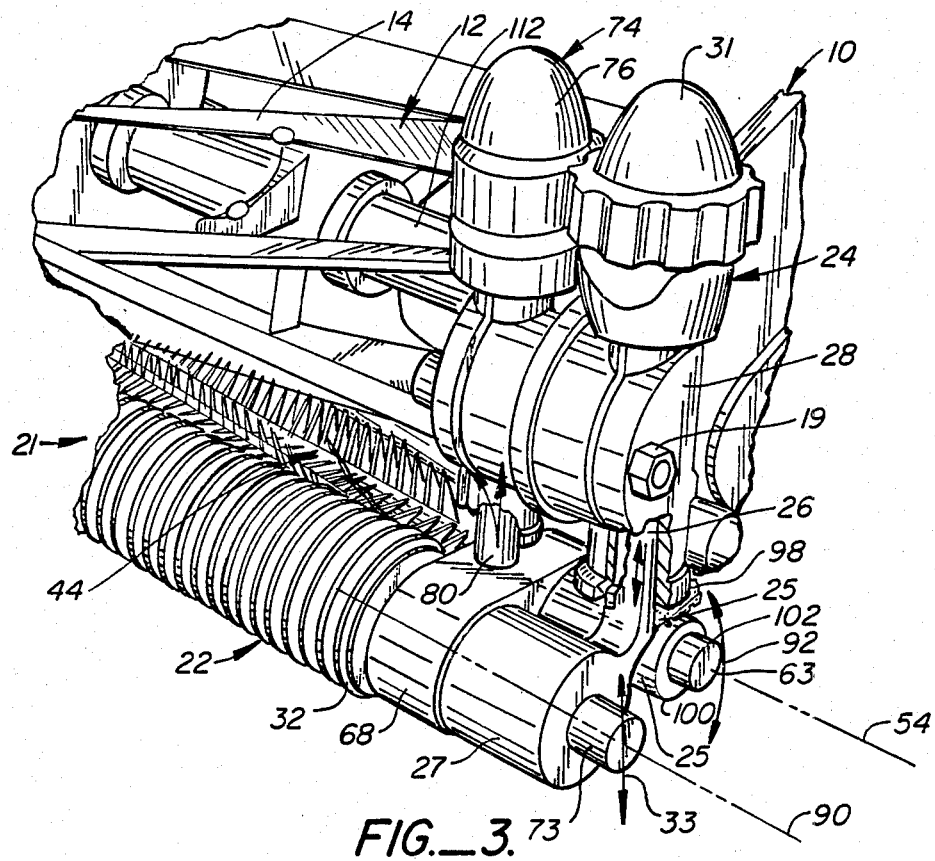
FIG._3.
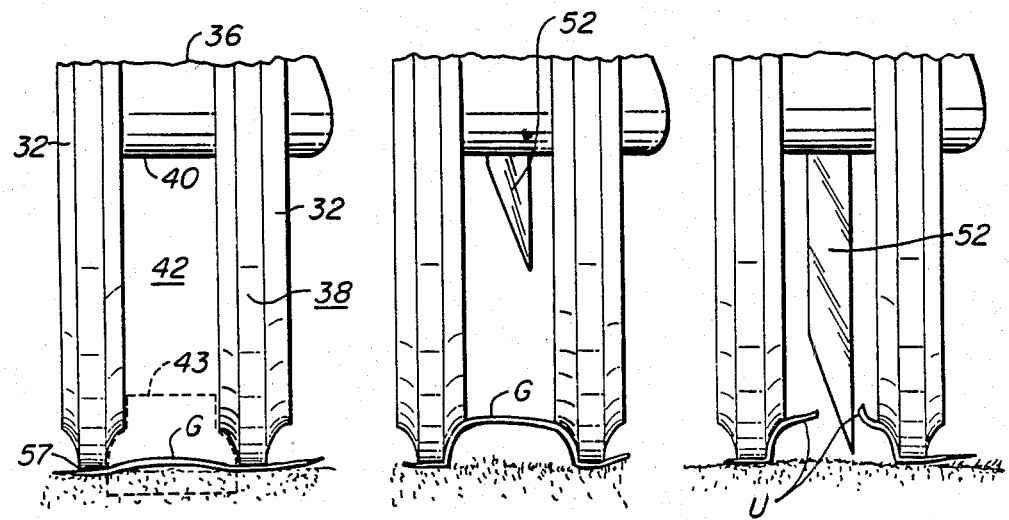
FIG._7A.   FIG._7B.   FIG._7C.

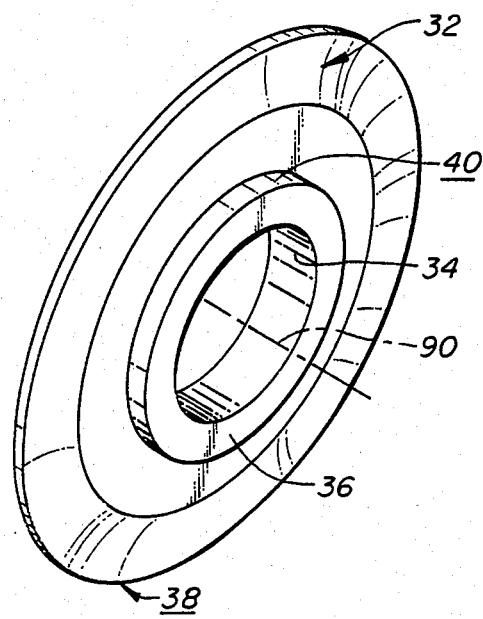
FIG._4.
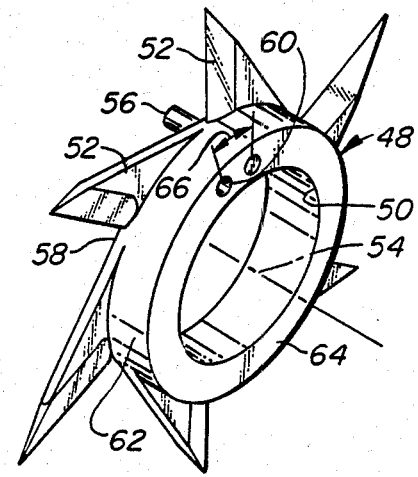
FIG._6.
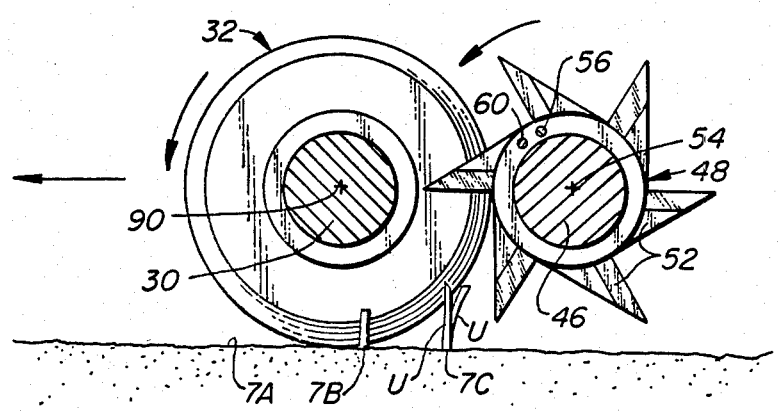
FIG._8.

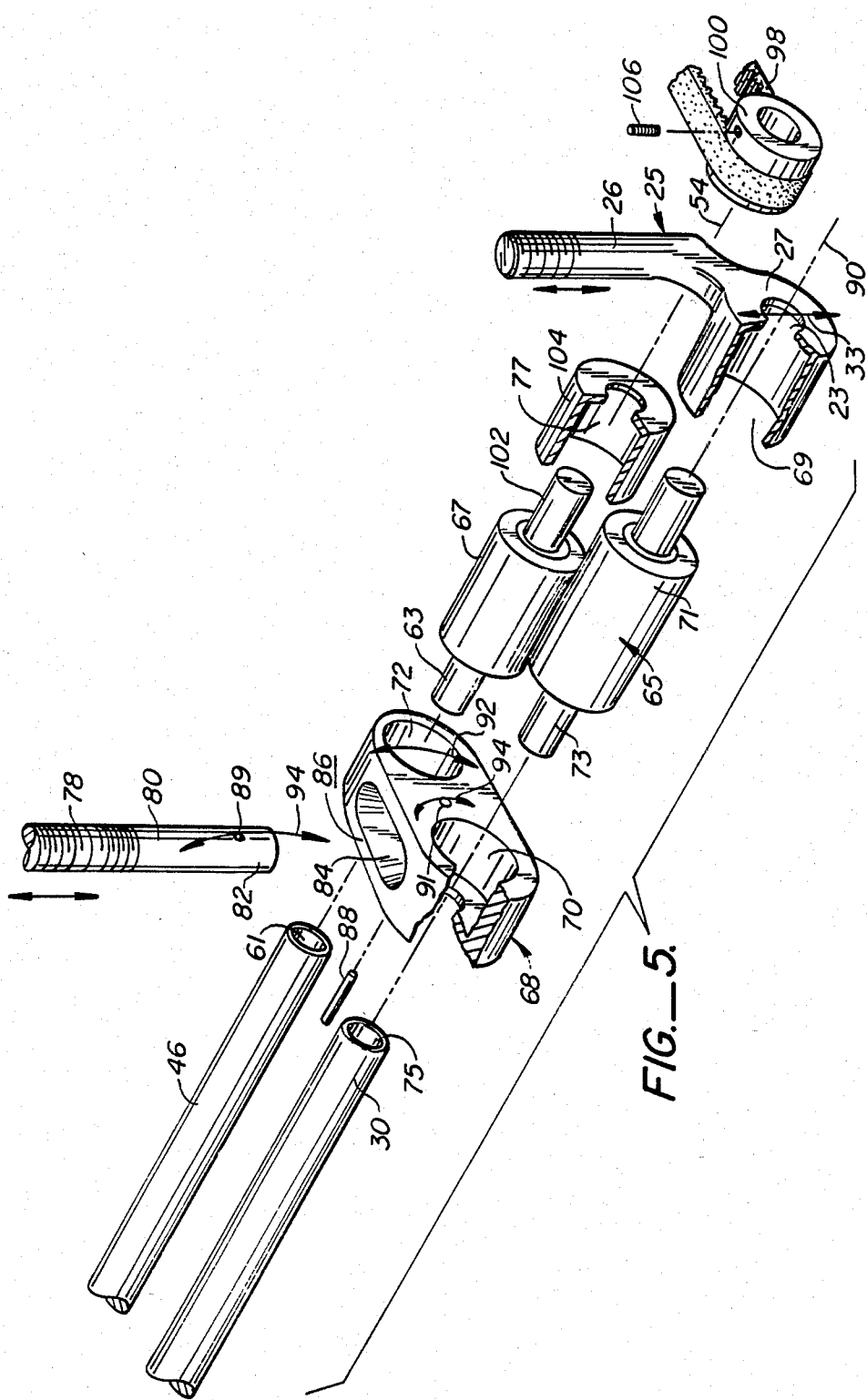
FIG._5.

MOWER CUTTING UNIT

BACKGROUND OF THE INVENTION

Grass growing as lawns, on golf course fairways and on putting and bowling greens, collectively termed turf, grows best when the thatch layer is not excessive. Thatch is the matted, often partially decaying, plant matter at the soil line. It is made up of stolons, rhizomes and horizontally growing grass blades as well as cut and decaying grass clippings. Removal of the thatch, which allows the new shoots of grass to sprout, for most lawns need not be done very often because the build-up of the plant material making up the thatch is about equal to its decay into humus.

The situation for closely cropped, dense turf, such as putting greens and bowling greens, is different. Such dense turf, because of the use to which they are subjected, is well fertilized so it grows fast and thick and may be cut daily for proper care. In addition to the naturally horizontally growing rhizomes and stolons, some grass and other plants grow horizontally in response to frequent mowing. The net result is fast thatch buildup which reduces the turf quality.

Complete removal of the thatch causes the destruction of the turf. To keep the thatch within desirable limits, the turf must be periodically renovated. This is typically done using a conventional mower attachment called a thatcher. The thatcher is used to cut a series of grooves in the turf to dislodge some of the matted organic matter. These renovation projects are expensive due to the direct cost of renovation and since the golf course must be shut down for a few days because of the temporary damage to the turf.

SUMMARY OF THE INVENTION

The present invention helps solve the problem of excessive thatch build up by lifting up and cutting horizontally growing plant material in conjunction with the normal periodic mowing without damaging the turf. The need for periodic renovation using standard thatchers is therefore greatly reduced or eliminated.

One type of conventional grass mower cutting unit includes a frame supporting a horizontally mounted reel having a number of spiral blades. The spiral blades of the reel are driven by the mower's power source to cut grass passing between them and a horizontal bed knife situated below the reel. The cutting unit is supported on the ground by front and rear rollers. Adjusting the height of the front and rear rollers changes the distance the bed knife is above the turf to adjust the height of cut in a standard manner.

The present invention is directed to an improvement to the above described cutting unit. In the improved cutting unit the standard front roller is replaced by an expunger cutting head and an associated drive assembly. The expunger cutting head includes a slotted expunger roller having numerous vertically oriented circular slots, also called expunger channels, defined between regularly spaced expunger discs. Immediately behind the expunger roller is mounted a knife roller. The knife roller includes numerous vertically oriented knife blades aligned with the circular slots of the expunger roller. The knife roller preferably is driven by the reel through a remotely actuated clutch.

As the expunger roller rolls along the turf, horizontally lying plant material is pulled or puckered up into the expunger channels between the expunger discs. The lifting or puckering up of the normally horizontally lying plant material allows the blades of the knife roller, which is driven at a high rate of speed about its own axis, to lift and slide through the lifted plant material.

The expunger roller is mounted to the frame of the cutting unit while the knife roller is pivotally mounted to the expunger roller. This allows the height of the knife roller to be varied without changing the set, optimum distance between the axis of the knife and expunger rollers and also without changing the height of the expunger roller. Therefore, the position of the bed knife, which is determined by the positions of the expunger and rear rollers, is not affected by adjusting the position of the knife roller.

A primary advantage of the present invention is that horizontally lying grass and other plant matter is lifted up into the expunger channels, severed vertically by the expunger blades and cut horizontally by the closely following reel blades. Therefore, both vertical and horizontal plant material is cut during normal mowing so the turf is in effect groomed each time the grass is cut. This eliminates or reduces extensive and expensive reconditioning programs.

A significant commercial advantage is achieved by the present invention because the expunger cutting head is adaptable for use with commercially available cutting units. Therefore, a large scale redesign of such commercially available units is not required. Also, the expunger cutting head and drive assembly are suitable for marketing as an add-on kit to transform standard mower cutting units into applicant's turf grooming cutting unit.

Another feature of the invention is the pivotal mounting of the knife roller to the expunger roller. The expunger roller, mounted to the frame of the cutting unit, supports the front end of the cutting unit on the turf. The rear roller supports the other end of the cutting unit. Depending upon the height of the grass and other operating conditions, the knife roller can be adjusted in height without affecting either the height of the bed knife or the center line distance between the knife roller and the slotted expunger roller. The proper centerline distance between the expunger and knife rollers is thus automatically maintained.

Another key feature of the invention is the use of radially extending knife blades mounted about the knife roller in a reverse spiral pattern relative to the direction of spiral of the reel blades. By doing this, the various knife blades pass through the circular slots in the expunger roller in a staggered manner for smooth operation. The mower reel is driven at one end while the other end of the reel drives the knife roller. This, coupled with the reverse spiraling of the knife blades, provides a balancing torque to the other end of the mower reel so the cutting unit applies an even pressure to the turf surface.

A preferred way of fabricating the knife and expunger rollers is by the use of a number of knife discs and expunger discs mounted over their respective shafts. The spiral staging of the blade or blades extending from each knife disc can be achieved by the use of a staging pin extending axially from one side of the knife disc and a staging hole extending into the opposite side of the knife disc. The staging pin and hole are offset in a rotary direction by a chosen angle. When a series of knife discs are mounted over the knife roller shaft, the staging pin of one knife disc engages the staging hole of the adjacent knife disc to offset the knife blades by the chosen angle and lock the knife discs together to rotate as one.

Other features and advantages of the present invention will appear from the following description in which the preferred embodiment has been set forth in detail in conjunction with the accompanying drawings.

BRIEF DESCRIPTION OF THE DRAWINGS

FIG. 1 is an overall view showing the turf grooming cutting unit of the invention mounted to a mower.

FIG. 2 is a left-hand side view of the cutting unit of FIG. 1.

FIG. 3 is an enlarged partial perspective view of the left front corner of the cutting unit of FIG. 2.

FIG. 4 is an enlarged isometric view of an expunger disc.

FIG. 5 is an exploded isometric view of a portion of the expunger cutting head shown in FIG. 3.

FIG. 6 is an enlarged isometric view of a knife disc showing the staging pin and the staging hole.

FIGS. 7A, 7B and 7C illustrate expunger discs pulling up and a knife blade severing normally horizontal plant material.

FIG. 8 is an end cross-sectional view of the knife roller and the expunger roller.

DETAILED DESCRIPTION OF THE PREFERRED EMBODIMENT

Referring now to FIGS. 1-3, a mower 2 is shown with three turf grooming cutting units 4 mounted thereto. Cutting unit 2 is a conventional mower cutting unit, such as one made by Toro Manufacturing Corp., Minneapolis, Minnesota as Model No. 04400, except as modified as described below. Conventional cutting units 2 are each powered by a hydraulic motor 6 which is supplied with hydraulic driving fluid through hydraulic lines 8 coupled to a power source on mower 2. Cutting unit 4 includes a frame 10 to which a horizontal reel 12 is mounted for rotation. Reel 12 is of conventional design and has a number of spiral blades 14 which cut vertically extending grass between the outer edges 16 of blades 14 and a bed knife 18 mounted to frame 10. The unmodified conventional cutting unit 4 includes a rear roller 20 and a front roller, not shown.

In the present invention the front roller found on conventional cutting units is replaced by an expunger cutting head 21 which includes a slotted expunger roller 22, a knife roller 48 and a knife roller drive assembly 96. Expunger roller 22 includes an expunger shaft 30 over which numerous expunger discs 32, shown in FIGS. 4 and 7A, are mounted. The height of the cut is adjusted by an expunger roller height adjuster 24, which is substantially identical to that used on the standard cutting unit. Adjuster 24, shown best in FIGS. 3 and 5, includes a shaft support 25 having a vertically extending threaded rod portion 26 and an enlarged lower end 27. Rod portion 26 passes through a rod housing 28 which is bolted to frame 10 by nut and bolts 19 and 29 (see FIG. 2). A knob 31 is mounted to the upper threaded end of rod portion 26. Shaft 30 is coupled to lower end 27 through an oval link 68 and a bearing 65. Link 68 includes a hole 70 and lower end 27 includes a bore 69 within which the outer race 71 of bearing 65 is housed. Bearing 65 includes a center shaft 73, one end of which is secured within an end bore 75 of shaft 30 and the other end of which passes freely through an opening 23 in lower end 27. Since expunger roller 22 replaces the front roller of a conventional cutting unit, rotating knob 26 causes expunger roller 22 to move along a vertical path 33 and thus adjust the height of cut of bed knife 18.

Expunger discs 32, seen best in FIGS. 4 and 7A, include a central opening 34, sized to be pressed on shaft 30, and a shoulder portion 36 having a diameter substantially less than the outside diameter of disc 32. Expunger disc 32 includes an outer diametral surface 38 and an inner diametral surface 40. Outer surface 38 includes an outer cylindrical surface portion 39 and circular arcuate portions 41. Outer surfaces 38 are those portions of roller 22 which rest on turf surface S while inner surfaces 40 define the roots of circular slots 42, also called expunger channels, defined between adjacent expunger discs 32 and extending between inner and outer surfaces 38, 40. Circular slots 42 include an outer region 43, indicated by dashed lines in FIG. 7A, having inwardly sloping sidewall portions 45 which guide the grass into slots 42 as described below.

Knife roller 44 is mounted immediately behind expunger roller 22, as shown in FIG. 8. Roller 44 includes a knife roller shaft 46 over which numerous knife discs 48 are mounted. Knife discs 48, seen in FIG. 6, include a central bore 50 sized for mounting over shaft 46 and six radially extending blades 52. Knife discs 48 are mounted to knife roller shaft 46 so that blades 42 form a reverse spiral path about the axis 54 of knife roller 44, relative to the spiral direction of blades 14, as seen in FIG. 3. This spiral offset or staging is achieved by extending a staging pin 56 from one side 58 of disc 48 and providing a staging hole 60 in a shoulder 62 extending from the opposite side 64 of knife disc 48. Pin 56 is sized for complementary mating engagement within staging hole 60. Pin 56 and hole 60 are located at the same radius from axis 54 but offset at an angle 66 from one another. This angular offset causes blades 52 to form a spiral path about axis 54 as is desired for smooth cutting action. After mounting onto shaft 46, knife discs 48 are mated as one and the end knife discs 48 are secured to the shaft such as by using a suitable adhesive or with set screws.

Referring now to FIGS. 3 and 5, shaft 46 includes end bores 61 within which are mounted the ends of the center shaft 63 of a bearing 67. Bearing 67 is in turn housed within a hole 71 in an oval link 68 and a bore 77 in a spacer 104. A knife roller height adjuster 74, similar in construction to expunger roller height adjuster 24, is mounted to frame 10 adjacent to and to the interior of adjusters 24. Adjusters 74 are used to vary the height of expunger rollers 44. Height adjuster 74 includes a cap 76 engaging the threaded end 78 of an adjuster bar 80. The lower end 82 of bar 80 is sized to fit loosely within an over sized hole 84 formed within the upper surface 86 of link 68. Bar 80 is secured within hole 84 by roll pin 88 which passes through complementary openings 89, 91 in bar 80 and link 68.

The position of knife roller 44 is adjusted relative to frame 10 by height adjusters 74. Vertical movement of bar 80 causes link 68 to pivot about an expunger axis 90 (since expunger roller shaft 30 is fixed in place by adjuster 24) passing through the center of hole 70. This pivotal movement is indicated by arrow 92. Therefore once the height of expunger roller 22 has been chosen, the height of knife roller 44 relative to cutting surface S is adjusted using adjuster 74 without changing the centerline distance between axes 54 and 90 and without affecting the height of bed knife 18 above surface S.

Because pivot member 68 pivots, in contrast with the vertical movement of shaft support 25, the point of connection between bar 80 and member 68 at roll pin 88 travels along an arc 94 during operation of adjuster 74. By making the connection between bar 80 and member 68 a pivotal one and by making hole 84 oversized, lower end 82 of bar 80 can move along arc 94 without binding.

Referring to FIGS. 2 and 5, knife roller 44 is driven by drive belt assembly 96. Assembly 96 includes a belt 98 which passes around a pulley 100. Pulley 100 is mounted to the outer end 102 of center shaft 63 which extends through tubular spacer 104. Pulley 100 is secured to shaft 63 by a set screw 106 to provide a driving interface between the pulley and the shaft.

Belt 98 is driven by a drive pulley 108 mounted to one end of the axle 110 of reel 12. Pulley 108 is operably coupled to and decoupled from axle 110 by remotely actuated clutch 112. Clutch 112 includes a solenoid assembly 114 mounted to frame 10 and a clutch unit 116 mounted between pulley 108 and the end of axle 110. Actuation of solenoid assembly 114 causes plunger 118 to extend engaging the periphery of clutch unit 116. This causes an internal sleeve, not shown, over which pulley 108 is mounted, to engage axle 110 thus driving belt 96. This clutch is an adaptation of one sold by Borg-Warner Corporation of Bellwood, Illinois as part no. EB 205-40-004. Other types of remotely actuated clutches may be used as well. A pivoting belt tensioner 120 keeps belt 96 taught regardless of the position of knife roller 44.

In use, nut and bolts 19 are loosened to allow adjusters 24, 74 to be manipulated. The position of expunger roller 22 is chosen using adjuster 24 according to the height of cut desired. The height of knife roller 44 is then adjusted using adjuster 74 according to the condition of the turf. Nut and bolts 19 are then tightened to secure both expunger and knife rollers 22, 44 in place relative to frame 10. During the operation of mower 2, during which hydraulic motor 6 powers reel 12, knife roller 44 is driven about its axis 54 upon the actuation of clutch 112. Expunger roller 22, which supports one end of cutting unit 4, rolls along surface S as mower 2 advances. As shown in FIGS. 7A-7C and 8, a piece of grass G, or other plant material, lying horizontally on surface S is pulled up between the rolling expunger discs 32 and into the circular slots 42 defined between discs 32. Curved sidewall portions 45 of outer regions 43 of circular slots 42 act to guide the pinched or puckered up grass G into the shape shown in FIG. 7B. In one embodiment slots 42 are about 4.5 mm wide, discs 32 have a thickness of about 3 mm and portions 45 have a radius of about 6 mm. These pinched up pieces of plant material are then pulled upright and sliced by the rapidly moving blades 52 of knife disc 48. Before the newly severed, generally upright grass segments U can lie down, they are cut between outer edges 16 of blades 14 and bed knife 18. Thus horizontally growing plant material is removed before it has a chance to build up into a thick, unhealthy thatch layer.

The reversed spiral staging of knife blades 52, illustrated in FIG. 3, allows for a smooth cutting action. This is in contrast with the vibration prone cutting action which would be likely if the knife blades were axially aligned. The speed of rotation of knife roller 44, the number of blades 52 and the height of knife roller 44 are all influenced by the operating conditions, particularly the grass height.

Cutting unit 4 is intended to be used each time the turf is cut. Old, tough and coarse rhizomes and stolons, as well as other horizontally growing plant material, are removed allowing for growth of new, healthy shoots. However, since blades 52 need not dig into the turf, damage to the turf is eliminated. In addition, since many broadleaf weeds cannot survive the action of blades 52, there is a greatly reduced need for eradication by use of herbicides when a mower using a cutting unit made according to the invention is used regularly.

The invention can be marketed as a kit for modifying existing cutting units. Doing so would entail minimal modifications to the existing unit other than replacing the existing front roller with expunger cutting head 21 and adding a drive assembly 96 with an associated switch for actuating clutch 112.

Modification and variation can be made to the disclosed embodiment without departing from the subject of the invention as defined in the following claims. If desired, expunger roller and knife roller may each be made from metal or a suitable plastic and also may be made as a unitary piece, such as by molding or casting. The shape of blades 52 can be varied and their numbers can be increased or decreased. Also, channels 42, and in particular outer region 43, may be varied in cross-sectional shape from the disclosed embodiment.

I claim:

1. A mower cutting unit of the type including a mower blade mounted for rotation to a frame and support members mounted to the frame which support the cutting unit on a mowing surface, the improvement comprising:
   one said support member comprising a generally horizontal slotted expunger roller mounted to the frame for rotation about an expunger roller axis, an outer expunger roller surface and a plurality of vertically disposed annular slots located in a predetermined axial pattern along said expunger roller, said slots dividing said expunger roller surface into a plurality of expunger roller surface segments;
   a supplementary cutter;
   means for mounting said supplementary cutter adjacent and behind said expunger roller; and
   means for actuating said supplementary cutter;
   whereby horizontally disposed plant matter is pulled up into said circular slots as said expunger roller surface segments roll over said plant matter to allow said supplementary cutter to cut said pulled up plant matter.

2. The cutting unit of claim 1 wherein:
   said supplementary cutter includes a knife roller including a knife roller axis and a plurality of knife blades positioned along said knife roller axis in said predetermined axial pattern;
   said actuating means includes means for rotating said knife roller and said knife blades therewith about said knife roller axis; and
   said supplementary cutter mounting means includes means for mounting said knife roller adjacent and behind said slotted expunger roller so said knife blades pass through said circular slots as said knife roller and knife blades therewith are rotated about said knife roller axis by said rotating means.

3. The cutting unit of claim 1 wherein said expunger roller is a front support member.

4. The cutting unit of claim 1 wherein said predetermined pattern is a regular pattern so said slots are evenly spaced along said expunger roller.

5. The cutting unit of claim 2 wherein said knife roller blades are arranged and adapted to pass through said slots.

6. The cutting unit of claim 5 wherein a plurality of said knife blades pass through each of said slots.

7. The cutting unit of claim 2 wherein said knife blades have generally radially directed cutting edges.

8. The cutting unit of claim 2 wherein said knife roller rotating means includes a drive belt operably coupled to the mower blade.

9. The cutting unit of claim 8 wherein said knife roller rotating means includes a remotely actuated clutch for selectively drivingly coupling said knife roller to the mower blade.

10. The cutting unit of claim 2 wherein:
said knife roller mounting means includes a link pivotally connecting said knife and expunger rollers, said link adapted to pivot about said expunger roller axis, and a knife roller height adjuster mounted to the cutting unit frame and operably coupled to said link to raise and lower said knife roller as said link and knife roller therewith pivot about said expunger roller axis so the centerline distance between said expunger roller and said knife roller axis remains constant.

11. The cutting unit of claim 10 wherein said knife roller height adjuster includes a link at each end of said knife roller.

12. The cutting unit of claim 10 wherein said knife roller height adjuster is connected directly to said link.

13. The cutting unit of claim 1 wherein said expunger roller comprises:
a main shaft; and
a plurality of expunger discs each having a central opening sized for mounting over said main shaft, an outer diametral surface, an inner diametral surface and a sidewall connecting said outer and inner diametral surfaces, said outer diametral surfaces defining said expunger roller surface segments and said inner diametral surfaces and said sidewalls defining said annular slots.

14. The cutting unit of claim 1 wherein said annular slots include an outer region adjacent said roller surface segments having inwardly sloping sides.

15. The cutting unit of claim 14 wherein said inwardly sloping sides are arcuate.

16. The cutting unit of claim 15 wherein said arcuate inwardly sloping sides have a circular contour.

17. The cutting unit of claim 2 wherein said knife roller comprises a plurality of knife roller segments mounted adjacent one another.

18. The cutting unit of claim 17 wherein said knife roller includes a knife shaft over which said knife roller segments are fixedly mounted for rotation with said knife shaft.

19. The cutting unit of claim 17 wherein said knife blades are generally radially directed.

20. The cutting unit of claim 19 further comprising rotary offset means for fixedly positioning said knife roller segments to one another with a rotary offset so said radially directed blades are arranged in a spiral along said knife roller axis.

21. The cutting unit of claim 20 further comprising a plurality of said knife blades at each said knife roller segment.

22. The cutting unit of claim 20 wherein said rotary offset positioning means includes axially extending pins extending from one side of said knife segment at a chosen position relative to said radially directed blades and complementary openings formed in a second, opposite side of said knife segments, said pins and openings being offset a chosen rotary angle for each said knife segment so said radially directed blades are in said spiral along said knife axis.

23. A cutting unit for a mower, the cutting unit of the type including a mower blade mounted for rotation to a frame, and also having front and rear support members mounted to the frame which support the cutting unit on a mowing surface, the improvement comprising:
said front support member comprising a slotted expunger roller mounted horizontally to the frame and having an expunger roller axis, an outer expunger roller surface and a plurality of vertically disposed annular slots located in a predetermined axial pattern along said expunger roller, said slots dividing said expunger roller surface into a plurality of expunger roller surface segments;
a knife roller including a knife roller axis and a plurality of knife blades arranged along said knife roller in said predetermined axial pattern, said blades positioned to pass through said slots;
means for rotating said knife roller and said knife blades therewith about said knife roller axis;
means for mounting said knife roller adjacent and behind said slotted expunger roller so said knife blades pass through said circular slots as said knife roller and knife blades therewith are rotated about said knife roller axis by said rotating means; and
said knife roller mounting means including a link pivotally connecting said knife and expunger rollers, at each end of said rollers, said link adapted to pivot about said expunger roller axis, and a knife roller height adjuster mounted to the cutting unit frame and operably coupled to said link to raise and lower said knife roller as said link and knife roller therewith pivot about said expunger roller axis so the centerline distance between said expunger roller and said knife roller axis remains constant;
whereby horizontally disposed plant matter is pulled up into said circular slots as said expunger roller surface segments roll over said plant matter so said rotating knife blades cut said pulled up plant matter.

* * * * *

REEXAMINATION CERTIFICATE (585th)

United States Patent [19]

Lloyd

[11] B1 4,494,365
[45] Certificate Issued Oct. 14, 1986

[54] MOWER CUTTING UNIT

[76] Inventor: Lawrence L. Lloyd, 1001 Olmstead Ave., Pacific Grove, Calif. 93950

Reexamination Request:
No. 90/000,912, Nov. 25, 1985

Reexamination Certificate for:
Patent No.: 4,494,365
Issued: Jan. 22, 1985
Appl. No.: 545,971
Filed: Oct. 26, 1983

[51] Int. Cl.$^4$ ............... A01D 34/53; A01D 34/42
[52] U.S. Cl. ............... 56/256; 56/229; 172/52
[58] Field of Search ............... 56/229, 256; 171/5; 172/52

[56] References Cited

U.S. PATENT DOCUMENTS

| | | | |
|---|---|---|---|
| 366,879 | 7/1887 | Ristvedt | 172/151 |
| 1,008,708 | 11/1911 | Eidem | 172/69 |
| 1,407,962 | 2/1922 | Thomas | 58/294 |
| 1,633,802 | 6/1927 | Wright | 58/294 |
| 2,032,777 | 3/1936 | Thomas | 56/229 |
| 2,204,569 | 6/1940 | Bushong | 97/6 |
| 2,246,880 | 6/1941 | Erke et al. | 56/294 |
| 2,300,851 | 11/1942 | Wolfard | 55/21 |
| 2,526,396 | 10/1950 | Nowlin | 97/140 |
| 3,338,037 | 8/1967 | Bauer et al. | 56/24 |
| 3,452,823 | 7/1969 | Shapland, Jr. | 172/42 |
| 3,528,231 | 9/1970 | Keller et al. | 56/11.6 |
| 3,641,754 | 2/1972 | Anstee | 56/341 |
| 3,739,856 | 6/1973 | Ray | 56/256 |
| 3,783,592 | 1/1974 | Schraut | 56/13.3 |
| 3,937,285 | 2/1976 | van der Lely | 172/52 |
| 3,998,034 | 12/1976 | Rubin | 56/11.6 |
| 4,202,414 | 5/1980 | vom Braucke et al. | 172/42 |
| 4,402,366 | 9/1983 | Dankel | 172/52 |
| 4,481,757 | 11/1984 | Tsuchiya | 56/249 |

FOREIGN PATENT DOCUMENTS

205718 10/1923 United Kingdom .
408610 4/1934 United Kingdom .

OTHER PUBLICATIONS

Toro Owner's Manual for Greensmaster Cutting Unit Model No. 04400.
Advertisement for Hahn Greens Management System, Model Tournament 1202.
Toro Owner's Manual for Greensmaster 3, Model No. 04311-10001, pp. 1, 7 and 8.
Golf Course Management, Apr. 1983, p. 30, advertisement for Bunton Greensmower.
Grounds Management, Apr. 1983, pp. 19-20.
Golf Business, Mar., "Verticutting Produces Smoother, Healthier Turf" by Dr. Fred. V. Grau.
Assembly Instructions for Wiehle Roller Kit for a Toro Greensmaster Cutting unit copyrighted 1976.
Operator's Manual for a Toro-built thatching reel used on a Greensmaster 3 Cutting Unit copyrighted 1976.

*Primary Examiner*—Paul J. Hirsch

[57] ABSTRACT

An improved cutting unit specially suited for grooming turf includes a frame supporting a conventional horizontally mounted driven reel having a number of spirally arranged blades. The cutting unit is supported on the ground by front and rear rollers. The front roller is a slotted expunger roller having numerous annular slots along its axis. Immediately behind the expunger roller is mounted a knife roller which includes numerous vertically oriented knife blades aligned with the circular slots of the expunger roller. As the expunger roller rolls along turf, horizontally lying plant material is pulled or puckered up by the expunger roller into the circular slots. The knife roller, driven at a high rate of speed about its own axis, pulls up and slices through the pulled up plant material. The expunger roller is mounted to the frame while the knife roller is pivotally mounted to the expunger roller to allow the height of the knife roller to be varied without changing the height of cut or the distance between the knife and expunger roller axes.

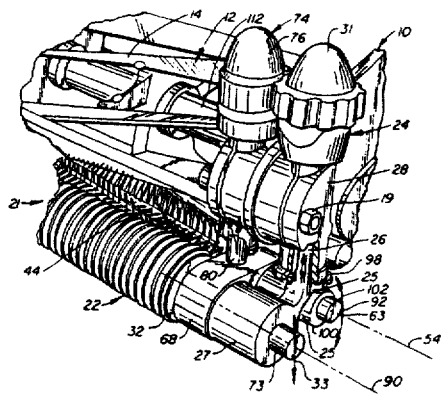

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 23 is confirmed.

Claim 5 is cancelled.

Claims 1, 2 and 6 are determined to be patentable as amended.

Claims 3, 4 and 7-22, dependent on an amended claim, are determined to be patentable.

New claim 24 is added and determined to be patentable.

1. A mower cutting unit of the type including a mower blade mounted for rotation to a frame and support members mounted to the frame which support the cutting unit on a mowing surface, the improvement comprising:
   a supplementary cutter including a plurality of cutting edges spaced apart in a predetermined axial pattern;
   one said support member comprising a generally horizontal slotted expunger roller mounted to the frame for rotation about an expunger roller axis, an outer expunger roller surface and a plurality of vertically disposed annular slots located in [a] the predetermined axial pattern along said expunger roller, said slots dividing said expunger roller surface into a plurality of expunger roller surface segments;
   [a supplementary cutter;]
   means for mounting said supplementary cutter adjacent and behind said expunger roller with the cutting edges passing within the annular slots; and
   means for actuating said supplementary cutter; whereby horizontally disposed plant matter is [pulled] raised up into said circular slots as said expunger roller surface segments roll over said plant matter to allow said supplementary cutter to cut said [pulled] raised up plant matter while leaving the mower surface substantially undamaged.

2. The cutting unit of claim 1 wherein:
   said supplementary cutter includes a knife roller including a knife roller axis and a plurality of knife blades positioned along said knife roller axis in said predetermined axial pattern;
   said actuating means includes means for rotating said knife roller and said knife blades therewith about said knife roller axis[; and
   said supplementary cutter mounting means includes means for mounting said knife roller adjacent and behind said slotted expunger roller so said knife blades pass through said circular slots as said knife roller and knife blades therewith are rotated about said knife roller axis by said rotating means].

6. The cutting unit of claim [5] 2 wherein a plurality of said knife blades pass through each of said slots.

24. A mower cutting unit of the type including a cutter mounted to a frame and support members mounted to the frame which support the cutting unit on a mowing surface, the improvement comprising:
   one said support member comprising a generally horizontal slotted expunger roller mounted to the frame for rotation about an expunger roller axis, an outer expunger roller surface and a plurality of vertically disposed annular slots located in a predetermined axial pattern along said expunger roller, said slots dividing said expunger roller surface into a plurality of expunger roller surface segments, the annular slots including outer regions adjacent the roller surface segments having inwardly sloping sides;
   the portions of the expunger roller defining the outer regions of the annular slots and the outer expunger roller surface creating means for puckering up plant matter into the annular slots as the surface segments roll over the plant matter;
   a supplementary cutter rotatably mounted to the frame and including a plurality of generally radially directed cutting edges spaced apart in the predetermined axial pattern;
   means for rotating said supplementary cutter;
   said supplementary cutter mounted adjacent and behind said expunger roller with the cutting edges passing within the annular slots so to lift and slice the puckered up plant matter.

* * * * *